US007146831B2

(12) United States Patent
Antonucci et al.

(10) Patent No.: US 7,146,831 B2
(45) Date of Patent: Dec. 12, 2006

(54) SLIDE LATCH

(75) Inventors: Jeff Antonucci, West Chester, PA (US); Robert Neale, Worcester (GB); Ismael Rodriguez, West Chester, PA (US)

(73) Assignee: Southco, Inc., Concordville, PA (US)

(*) Notice: Subject to any disclaimer, the term of this patent is extended or adjusted under 35 U.S.C. 154(b) by 0 days.

(21) Appl. No.: 10/993,747

(22) Filed: Nov. 19, 2004

(65) Prior Publication Data

US 2005/0144993 A1 Jul. 7, 2005

Related U.S. Application Data

(63) Continuation-in-part of application No. 10/744,140, filed on Dec. 22, 2003, now abandoned.

(51) Int. Cl.
*G05B 55/00* (2006.01)

(52) U.S. Cl. .............................. 70/208; 70/78; 70/467; 292/175; 292/DIG. 31

(58) Field of Classification Search .................. 70/208, 70/28–80, 478, 483, 488; 292/175; 312/215
See application file for complete search history.

(56) References Cited

U.S. PATENT DOCUMENTS 2,878,389 A 3/1959 Raffman ..................... 378/188
3,841,674 A * 10/1974 Bisbing et al. ............. 292/175
3,850,464 A * 11/1974 Bisbing et al. ............. 292/175
4,470,624 A 9/1984 Bisbing ...................... 292/169
4,676,081 A * 6/1987 Craig .......................... 70/169
4,683,736 A * 8/1987 Weinerman et al. .......... 70/208
4,790,579 A * 12/1988 Maxwell et al. ............ 292/175
4,995,649 A * 2/1991 Magnusson ................. 292/175
5,315,850 A 5/1994 Edeus et al.
5,358,291 A 10/1994 Malmanger et al. ........ 292/175
5,482,333 A * 1/1996 Gehrs et al. ................ 292/163
5,878,608 A * 3/1999 Alyanakian .................. 70/208
5,897,147 A 4/1999 Alyanakian et al. ........ 292/175
D409,473 S 5/1999 Tieu ............................ D8/342
5,934,716 A 8/1999 Koveal et al. .............. 292/175
5,974,842 A 11/1999 Schlack et al. ............... 70/208

(Continued)

FOREIGN PATENT DOCUMENTS

GB 2180290 A 3/1987

OTHER PUBLICATIONS

Southco Handbook, 2000, English Edition, pp. 110-111.

(Continued)

*Primary Examiner*—Suzanne Dino Barrett
*Assistant Examiner*—Christopher Boswell
(74) *Attorney, Agent, or Firm*—Paul & Paul

(57) ABSTRACT

The present invention relates to a lockable latch for securing together a first panel to a second panel or keeper on a second panel or frame. The latch has a housing, a lockplug configured for a key, a lock collar and a return spring. When a user turns a key to rotate the lockplug and thereby lock the lockplug, the lock collar rotates through 90 degrees and a portion thereof occupies the space or gap between an edge of the first panel and a portion of the latch housing configured and dimensioned to receive the edge of the first panel or frame. As a result, space between an edge of the housing and the first panel is taken up by a portion of the locking collar due to rotation of the locking collar in the housing.

19 Claims, 9 Drawing Sheets

U.S. PATENT DOCUMENTS

| | | | | |
|---|---|---|---|---|
| 6,023,953 | A * | 2/2000 | Vickers et al. | 70/208 |
| 6,050,618 | A | 4/2000 | Tieu | 292/175 |
| 6,138,484 | A * | 10/2000 | Sauerland et al. | 70/78 |
| 6,145,352 | A * | 11/2000 | Vickers et al. | 70/208 |
| D453,468 | S | 2/2002 | Ziemer et al. | D8/339 |
| 6,553,796 | B1 * | 4/2003 | Finch | 70/208 |
| 6,722,713 | B1 | 4/2004 | Straka, Jr. | 292/175 |
| 2003/0150246 | A1 * | 8/2003 | Gladden et al. | 70/208 |

OTHER PUBLICATIONS

Photographs of load floor latch used in Saturn Vue automobile (5 pages).

Dzus Catalog, p. 35, Series 404 Latch.

Camloc Catalog, p. F-95, PTL30 Series Latch.

Southco Latches and Access Hardware Handbook 43 (1993), pp. G-18 and G-19.

* cited by examiner 118
122
117
121
123

115
121
118

115

113
103
140
102
104
113
142
108
119
103
102

102
113
104

SLIDE LATCH

CROSS REFERENCE TO RELATED APPLICATIONS

This application is a continuation-in-part of U.S. Ser. No. 10/744,140 filed on Dec. 22, 2003 now abandoned.

BACKGROUND OF THE INVENTION

The present invention relates to slide latches for doors, panels and the like. The latches incorporate a locking feature and are resistant to corrosion, making them useful in automotive, recreational vehicle, marine and other applications. The latch can be repeatedly latched and unlatched by a user who desires to fasten a first panel to which the latch is attached to a second panel or structure.

Various types of slide latches are known. These latches are inserted in a cut-out opening of a first panel and are slidable in the plane of the first panel to engage a second panel or frame member. Conventional slide latches are typically relatively complex to assemble and susceptible to corrosion.

A need exists for a latch which can provide an improvement over the prior art in that it will be less costly to produce and less time-consuming to assemble, as well as providing slam-action latching ability when the panel is unfastened from a frame or second panel position.

A further need exists for a latch which can be slammed shut to close from an open state when the panel is not fastened to a second panel or a frame.

The present invention has been developed in view of the foregoing, and to overcome the deficiencies of the prior art.

SUMMARY OF THE INVENTION

The present invention is directed to a slide latch for securing a first panel in a frame to a second panel.

An object of the present invention is to provide a novel locking slide latch.

The present invention in one embodiment comprises a latch housing, a lock plug which is configured to receive a key, a lock collar around the lock plug at the top portion thereof and a spring mounted in one end of the housing. A pawl on the housing of the latch which is configured and positioned to secure the first panel in which the latch is installed to a second panel when the latch is in the closed position. A biasing device such as a spring biases the latch so as to keep the latch in the fully closed position. The spring also acts as a biasing means in order to minimize undesired movement of the latch which may cause rattling of the latch when the latch is in an at rest or closed position.

A user can slide the latch to the closed position and lock the latch by using the key to rotate the lock plug to a locked position which also rotates the locking collar. When a user has so positioned the lock plug, the locking collar around the top portion of the lock plug blocks the sliding of the latch in the cutout portion of the first panel, thereby keeping the latch in the locked position. When a user rotates the key in the lock plug to the unlocked position, the portion of the locking collar which blocks sliding movement of the latch rotates away free and clear of the panel in which the latch is mounted. The latch can now be slid in a direction leading away from the pawl, thereby permitting sliding movement of the latch toward an unlocked position such that the pawl of the latch can clear the second panel or keeper on a second panel. The first panel can then be moved away from the second panel.

In a second embodiment of the present invention, the locking collar of the latch is dimensioned and configured differently from the locking collar of the first embodiment. The locking collar has a blocking portion in contact with a spring having a spring leg which engages a first detent on the locking collar adjacent to the blocking portion of the locking collar when the latch is in a locked position. When a user rotates the latch to an unlocked position the spring leg of the spring then moves into a position such that the spring leg engages a second detent.

Another object of the present invention is to provide a locking slide latch that comprises components that can be assembled together without the use of conventional fasteners such as screws and adhesives.

A further object of the present invention is to provide a locking slide latch that is resistant to corrosion.

Another object of the invention is to provide a locking slide latch which does not present an electrical safety hazard as the lock plug of the present invention is totally enclosed in a housing formed from electrically nonconductive or electrically insulated material.

Another object of the invention is to provide a latch which allows a panel to be fastened by a slam action. This is accomplished by the shape of the pawl which interacts with the second panel or a keeper on the second panel.

Another object of the present invention is to accomplish the above objects by providing a latch which can be closed by slam-action.

Another object of the present invention is to provide a latch which can be used in connection with panels to regulate access to and from an area or compartment.

These and other objects of the present invention will be more readily apparent when taken into consideration with the following description and the attached drawings.

DETAILED DESCRIPTION OF THE INVENTION

Figures 1, 2, 3, 4, 5, 6, 7:
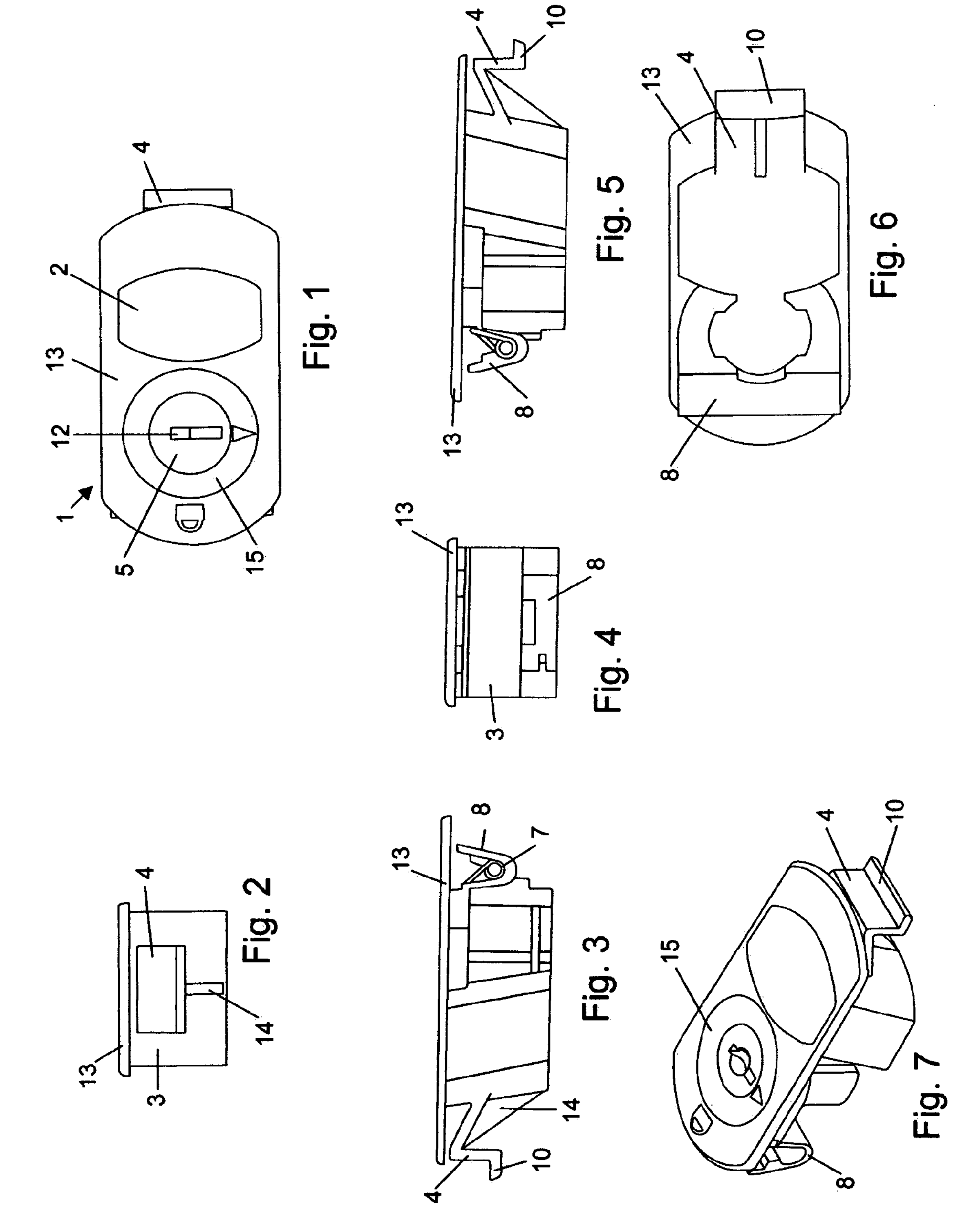
FIG. 1 is a top view of a preferred embodiment of a latch in accordance with the present invention showing the pawl, lock plug, and housing in the unlocked position.
FIG. 2 is a front elevational view of the latch of FIG. 1.
FIG. 3 is a right side elevational view of the latch of FIG. 1.
FIG. 4 is a rear elevational view of the latch of FIG. 1.
FIG. 5 is a right side elevational view of the latch of FIG. 1.
FIG. 6 is a bottom plan view of the latch of FIG. 1.
FIG. 7 is a perspective view of the latch of FIG. 1.

Referring now to the drawings in detail, wherein like reference numerals indicate like elements through the several views, there is shown in FIGS. 1–7, different views of a preferred embodiment of a latch 1 in accordance with the present invention shown with a housing 3, grip recess 2 for use by a user to slide the latch 1 and pawl 4 which upon sliding of the housing 3 engages a panel or keeper connected to a panel or prevents the pawl from moving past a keeper on the second panel. The housing 3 shown in FIG. 1 includes a flange 13 which fits up against first panel 9.

The term panel as used herein is defined broadly to include any structure or member, such as a frame or panel, that is capable of being fastened to the panel in which the slide latch of the present invention is installed.

A lock plug 5 is inserted into housing 103 which in turn preferably covers the bottom of lock plug 5 such that lock plug 5 can not be seen by a viewer as is readily apparent in the bottom view of the latch as shown in FIG. 6. The lock plug 5 can be snap fit in the latch housing 1 by the action of a spring biased sixth wafer 6 seen in FIG. 8. In its rest position, the sixth wafer 6 can rest against a recess in an inside surface of the latch housing 3. Additional wafers 11 which are inserted in lock plug 5 are held in place by a biasing device (not shown) which imparts a force against a key (not shown) when the key is inserted in key slot 12 in the conventional way such that the lock plug 5 can be rotated in the latch housing 3 to a locked position. When the key is then removed the wafers keep the lock plug locked in a locked state due to their engagement against the inside surface of the lockplug.

Figure 17:
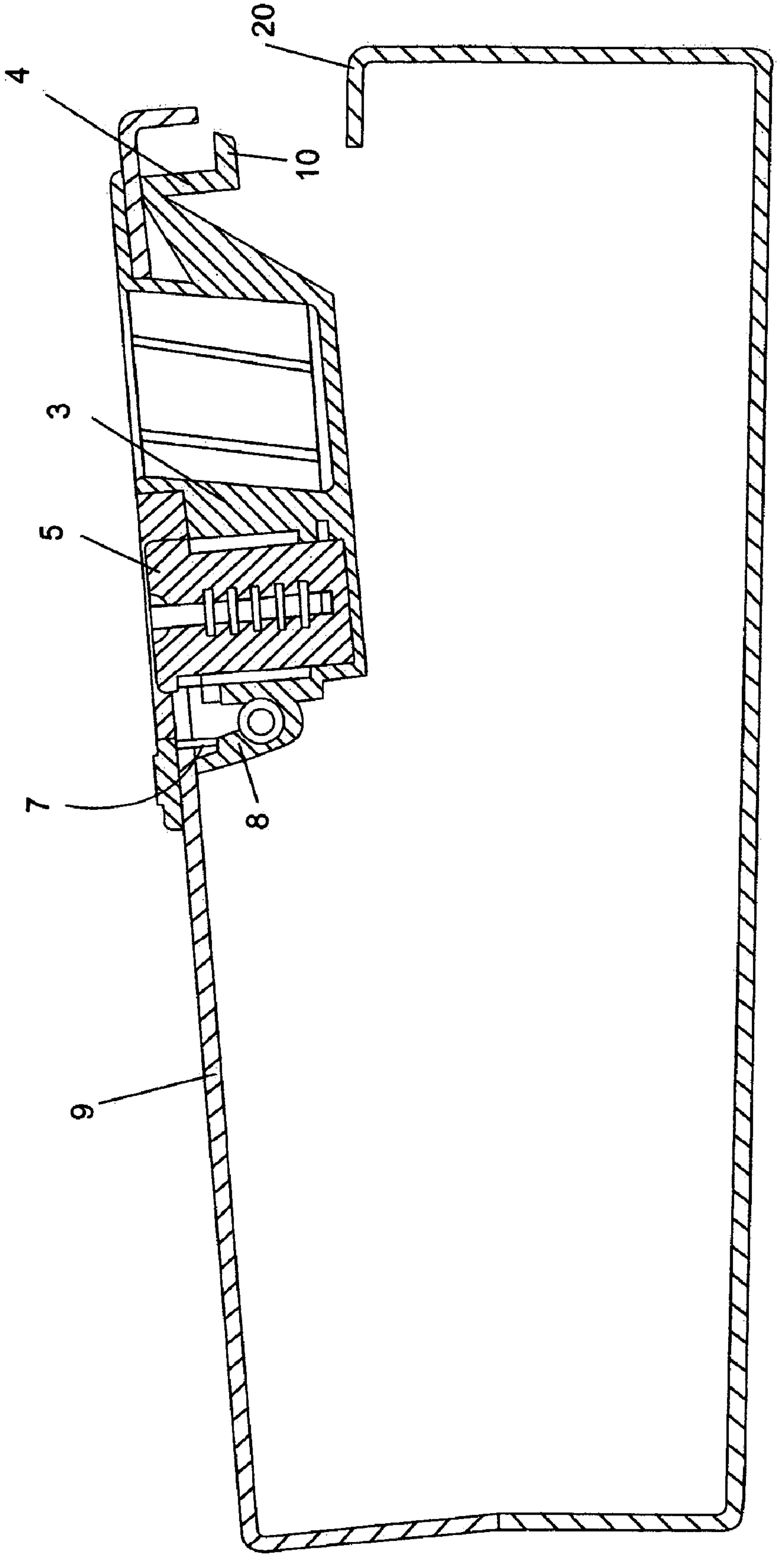
FIG. 17 is a side elevational view of the latch of FIG. 1 shown installed in a first panel.
Figure 19:
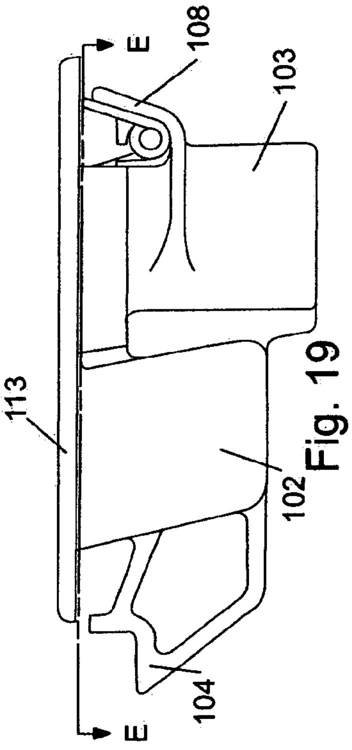
FIG. 19 is a side elevational view of the latch of FIG. 18 in an unlocked position.

A biasing device or in the alternative a spring 7 which is located in spring support 8 is biased against first panel 9 as shown in FIG. 17 and acts to return the latch to the closed position such that preferably protuberance 10 on pawl 4 maintains the first panel 9 in a closed position relative to second panel 20 when the latch is installed in first panel 9. The biasing device 7 is preferably a spiral spring and can be held in place by retaining projection 16 on the inside surface of the spring support 8.

The pawl 4 can have a protuberance 10 which provides for slam closing action of the pawl when the first panel 9 is slammed closed. The pawl also can include a gusset 14 which provides for further support to the structure of the pawl and facilitates reliable operation of the pawl.

Figure 12:
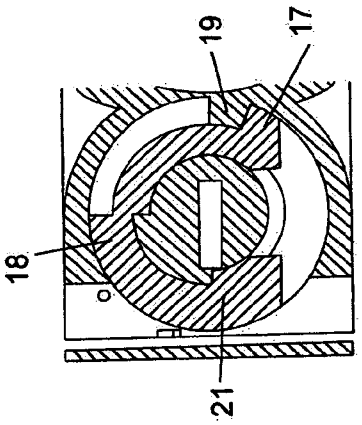
FIG. 12 is a sectional view taken along line B—B of FIG. 10.
Figure 9:
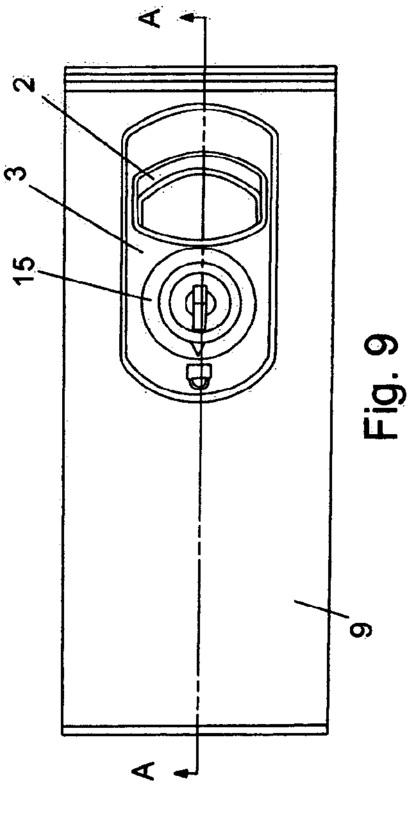
FIG. 9 is a top plan view of the latch of FIG. 1 shown in a first panel in a locked position.
Figure 16:
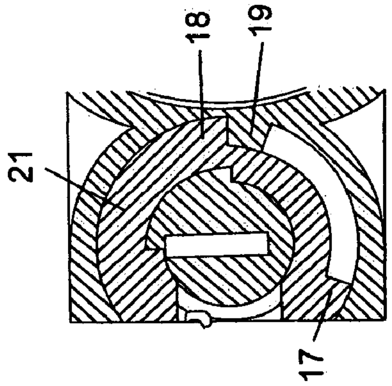
FIG. 16 is a sectional view taken along line D—D of FIG. 14.
Figure 13:
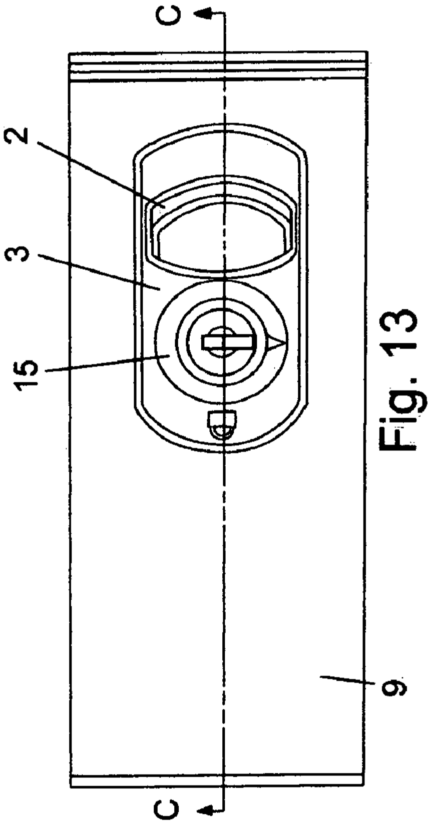
FIG. 13 is a top plan view of the latch of FIG. 1 shown in a first panel in an unlocked position.
Figure 15:
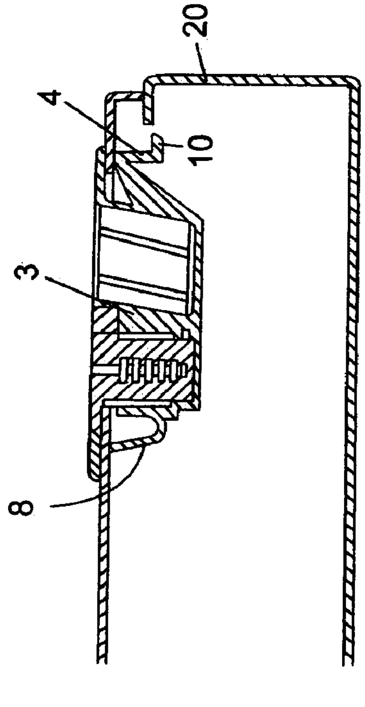
FIG. 15 is a sectional view taken along line C—C of FIG. 13 shown with the spring removed in a first panel.

Locking collar 15 fits around lock plug 5 and is rotatable preferably about 90 degrees around lock plug 5. Locking collar 15 has protrusions 17 and 18 which limit the rotation of the locking collar 15 around lock plug 5 against inside surfaces of latch housing 3. When a key (not shown) is inserted in lock plug 5 and is rotated by a user, lock plug 5 and locking collar 15 move together and rotate as seen in FIGS. 12 and 13. When a user desires to place the latch 1 in an unlocked position from a locked position, the user rotates lock plug 5 with a key (not shown) and locking collar protrusion 17 on lock plug 5 rotates away from housing projection 19. The lock plug 5 and locking collar 15 rotate until locking collar protrusion 18 contacts housing projection 19 to thereby place the latch in an unlocked position as seen in FIGS. 15 and 16.

Figure 14:
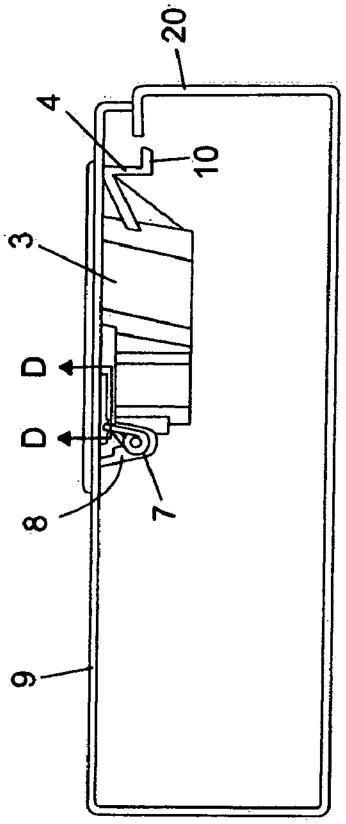
FIG. 14 is a side elevational view of the latch of FIG. 13 shown in a first panel in an unlocked position.

When the latch 1 is unlocked the latch 1 can be slid in the direction of spring support 8 as seen in FIG. 14 thereby allowing the protuberance 10 on pawl 4 to clear the second panel 20 and thereby permit the opening of the first panel 9.

Figure 10:
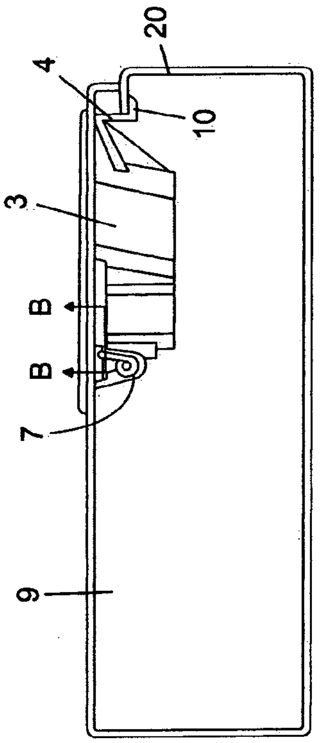
FIG. 10 is a side elevational view of the latch of FIG. 1 shown in a first panel.
Figure 11:
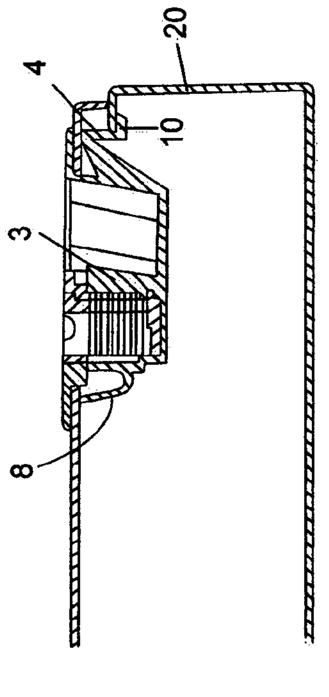
FIG. 11 is a sectional view taken along line A—A of FIG. 9 of the latch of FIG. 1 shown with the spring removed in a first panel.

When the latch 1 is in a locked position as seen in FIGS. 10–12, a blocking portion 21 of the locking collar 15 rotates into the gap between the edge of the first panel 9 and that portion of the housing 3 on the spring support side of the housing 3 so as to prevent sliding movement of the latch 1 in the direction of the spring support 8.

In a second embodiment of the latch of the present invention as seen in FIGS. 18 to 22, latch 101 in accordance with the present invention shown with a housing 103, grip recess 102 for use by a user to slide the latch 101 and pawl 104 which upon sliding of the housing 103 engages a panel or keeper connected to a panel or prevents the pawl from moving past a keeper on the second panel. The housing 103 shown in FIGS. 18, 19 and 20 includes a flange 113 which fits up against a panel (not shown).

Figure 23:
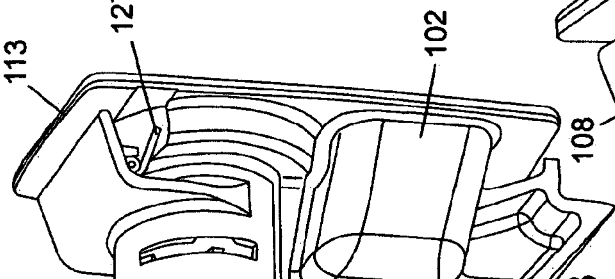
FIG. 23 is a perspective view of the latch of FIG. 18 in an unlocked position.
Figure 24:
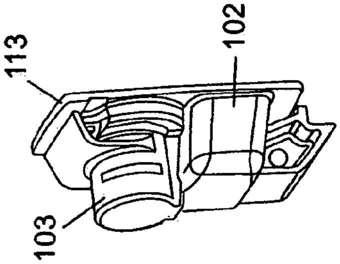
FIG. 24 is a perspective view of the latch of FIG. 18 in a locked position.

A lock plug 105 is inserted into housing 101 which in turn preferably covers the bottom of lock plug 105 such that lock plug 105 can not be seen by a viewer as is readily apparent in the bottom perspective view of the latch as shown in FIG. 23. The lock plug 105 can be snap fit in the latch housing 103 by the action of a spring biased sixth wafer 6. In the rest position, the sixth wafer 6 can rest against a recess in an inside surface of the latch housing 103. Additional wafers 11 which are inserted in lock plug 105 are held in place by a biasing device (not shown) which imparts a force against a key (not shown) when the key is inserted in key slot 112 in the conventional way such that the lock plug 105 can be rotated in the latch housing 103 to a locked position. When the key is then removed the wafers keep the lock plug 105 locked in a locked state due to the engagement of wafers 11 against the inside surface of the lockplug 105.

Figure 20:
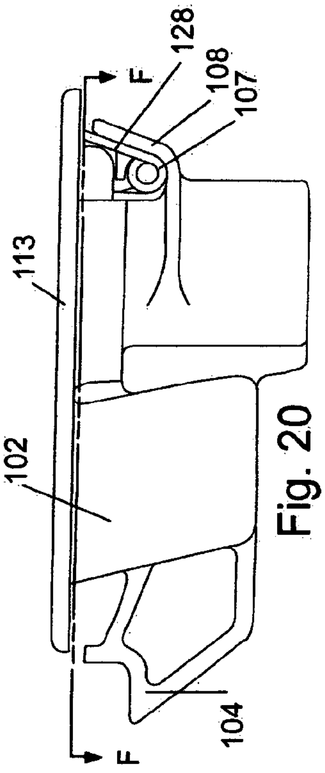
FIG. 20 is a sectional view of the latch of FIG. 18 in a locked position.

A biasing device or in the alternative a spring 107 which is located in spring support 108 as shown in FIG. 20. The biasing device 107 is preferably a spiral spring as shown. Locking collar 115 fits around lock plug 105 and is rotatable preferably about 90 degrees around lock plug 105. Locking collar 115 has protrusions 117 and 118 which limit the rotation of the locking collar 115 around lock plug 105 against inside surfaces of latch housing 103. When a key (not shown) is inserted in lock plug 105 and is rotated by a user, lock plug 105 and locking collar 115 move together and rotate. When a user desires to place the latch 101 in an unlocked position from a locked position, the user rotates lock plug 105 with a key (not shown) and locking collar protrusion 117 on lock plug 105 rotates away from housing projection 119. The lock plug 105 and locking collar 115 rotate until locking collar protrusion 118 contacts housing projection 119 as seen in FIG. 22 to thereby place the latch 101 in an unlocked position as seen in FIG. 21.

Figure 25:
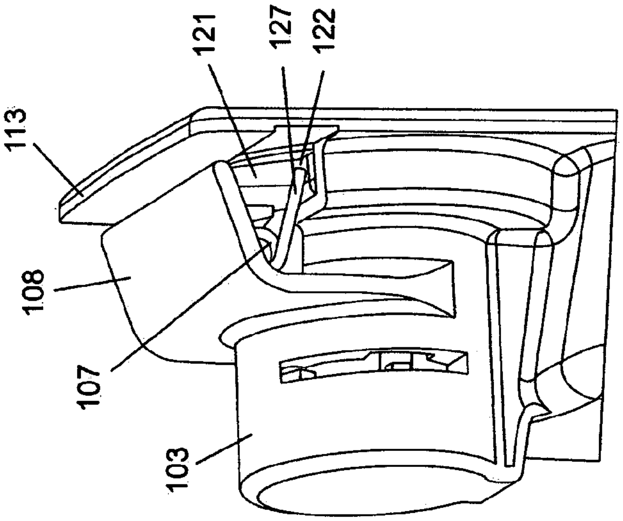
FIG. 25 is a perspective view of a portion of the latch of FIG. 24 in a locked position.
Figure 26:
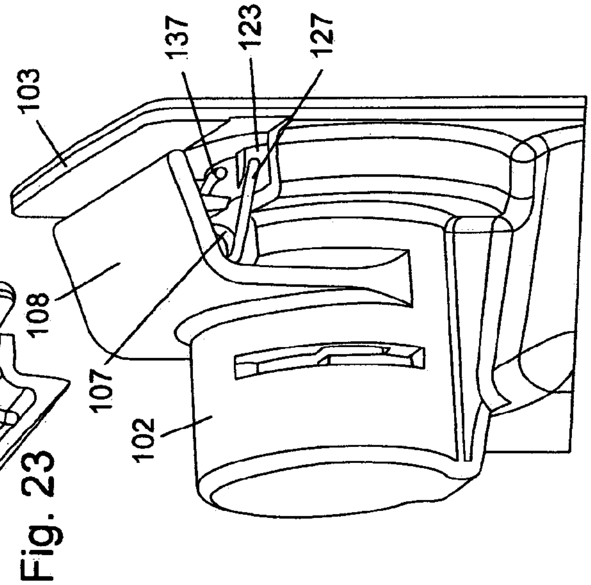
FIG. 26 is a perspective view of a portion of the latch of FIG. 23 in an unlocked position when the latch is urged against a panel the latch is installed in against the free spring leg of the latch.
Figure 27:
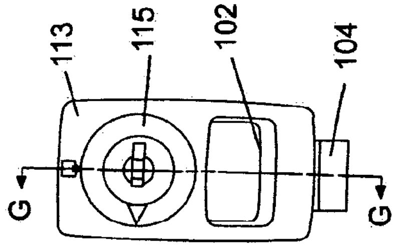
FIG. 27 is a top plan view of the latch of FIG. 18 in the open and unlocked position.
Figure 28:
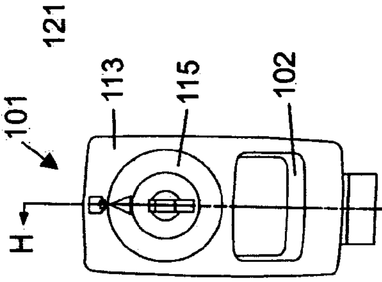
FIG. 28 is a top plan view of the latch of FIG. 18 in the closed and locked position.
Figures 32, 33, 34, 35, 36, 37:
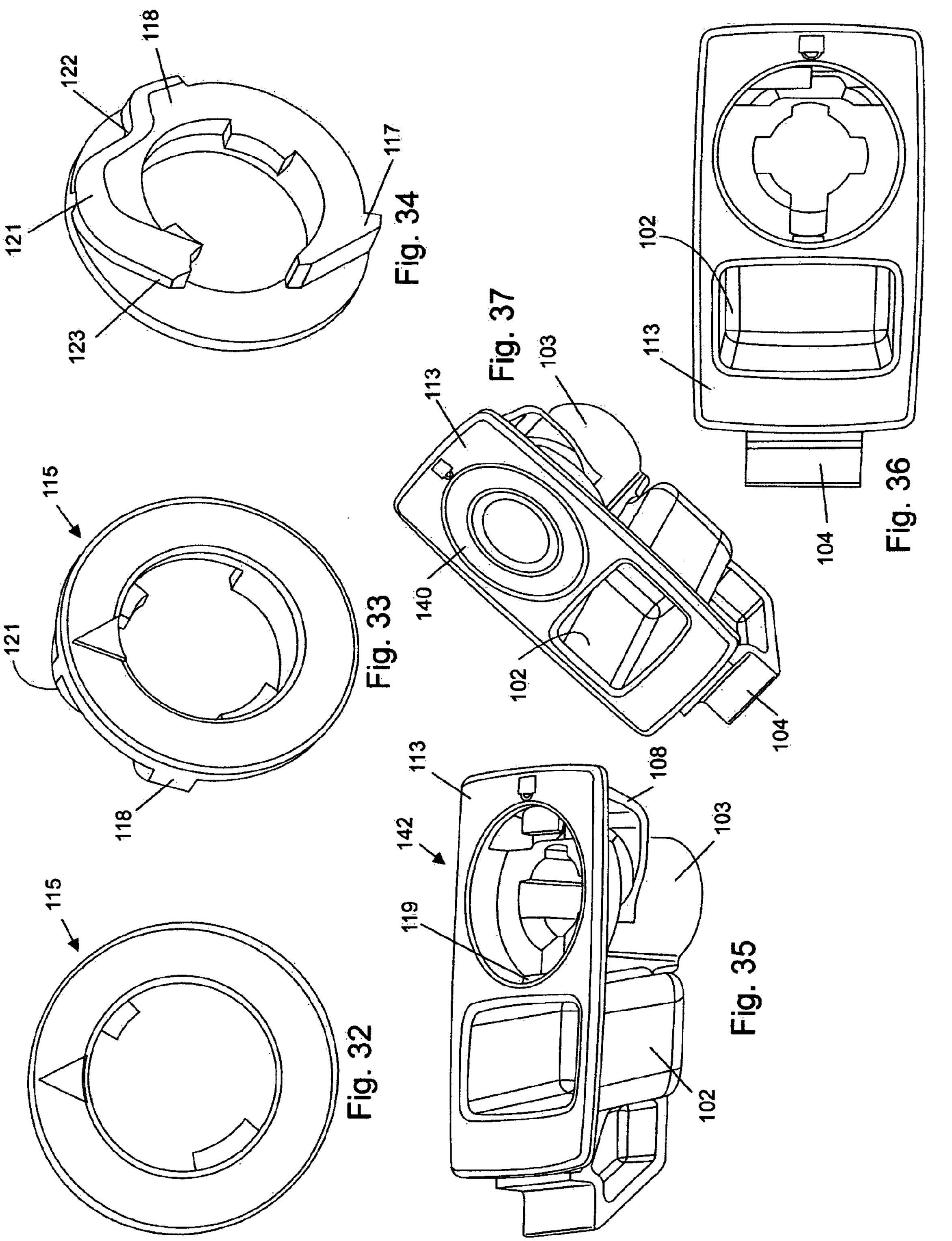
FIG. 32 is a top plan view of the locking collar of the latch of FIG. 18.
FIG. 33 is a perspective view of the top of the locking collar of the latch of FIG. 18.
FIG. 34 is a perspective view of the bottom of the locking collar of the latch of FIG. 18.
FIG. 35 is a perspective view of the latch body of the latch of FIG. 18.
FIG. 36 is a top plan view of the latch body of the latch of FIG. 18.
FIG. 37 is a perspective view of the latch of FIG. 18 shown having a cap installed in the housing.

The second embodiment of the latch is provided with a locking collar 115 which is dimensioned and configured differently from the locking collar of the first embodiment. The locking collar has a blocking portion 121 in contact with spring 107 having a spring leg 127 which engages a first detent 122 on the locking collar 115 adjacent to the blocking portion 121 of the locking collar 115 when the latch 101 is in a locked position. When a user rotates the latch to an unlocked position the spring leg 127 of the spring 107 then moves into a position such that the spring leg 127 engages a second detent 123. The movement of the spring leg 127 from first detent 122 in the locked position as seen in FIGS. 22 and 25 to second detent 123 in the unlocked position as shown in FIG. 21 has the advantage that a user who turns a key (not shown) in the lock plug 105 and rotates the lock plug 105 receives feedback as he rotates the key against the biasing forces acting on the spring leg 127. The user will be able to detect an increase in the force required to rotate the key and in turn the lock plug 5 as the end of spring leg 127 rides against blocking portion 121 until the spring leg 127 has passed over a location on the blocking portion 121 which is furthest from the axis of rotation of the lock plug 105. After the spring leg 127 passes over the above described location the biasing force acting on the spring leg 127 will decrease and the spring leg 127 can return to a second detent 123 as seen in FIG. 21. A preferred locking collar is shown in FIG. 34. The blocking portion 121, first detent 122 and second detent 123 can also be of any dimensions and configuration which permits the above described increase in the force that is required to rotate the lock plug such that the spring leg rides onto the blocking portion. Additionally, a decrease in the required force to rotate the lock plug can occur as the spring leg rides past the blocking portion. This initial increase in the force required to rotate the lock plug followed by a decrease in the required force to rotate the lock plug can apply both when the lock plug is rotated from the locked position to the unlocked position and when the lock plug is rotated from the unlocked position to the locked position.

Figure 22:
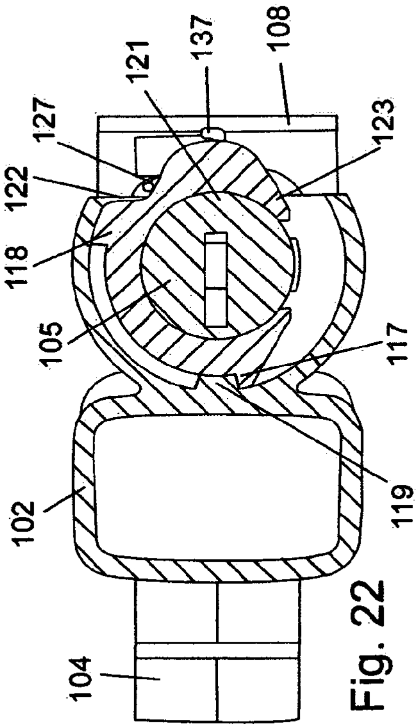
FIG. 22 is a sectional view taken along line F-F of the latch of FIG. 20 in an unlocked position.
Figure 18:
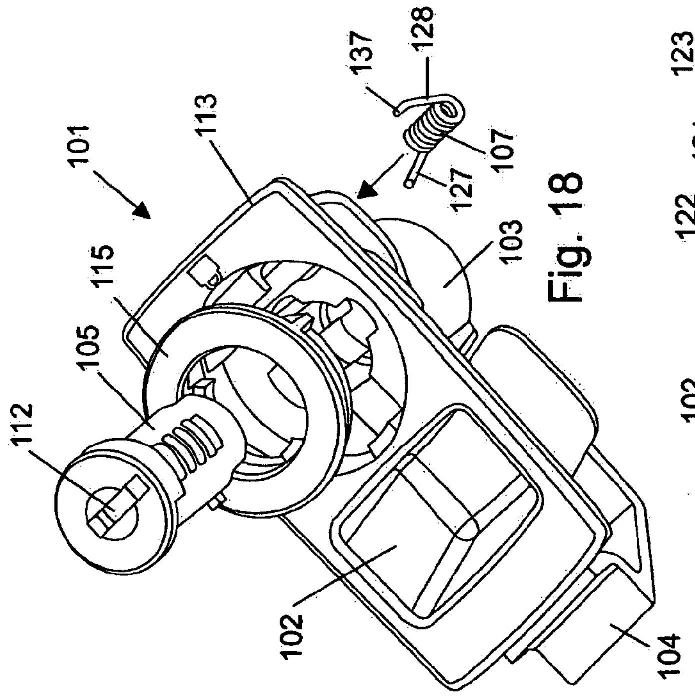
FIG. 18 is an exploded view of a second embodiment of the latch of the present invention.
Figure 21:
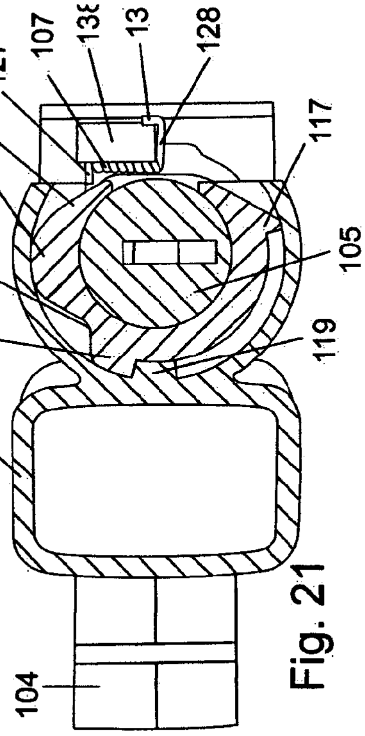
FIG. 21 is a sectional view taken along line E—E of the latch of FIG. 19 in an unlocked position.

The locking collar 115 can also be dimensioned and configured as seen in FIGS. 21, 22 and 34 such that the riding of the spring leg 127 from the first detent 122 over blocking portion 121 to second detent 123 results in a click which can be audible to the user.

Spring 127 can be located in spring housing 138 which can have a flat top portion as seen in FIG. 21 such that spring leg foot 137 of bent spring leg 128 is bent over the top portion of spring housing 138 and can maintain spring 127 in position.

Figure 29:
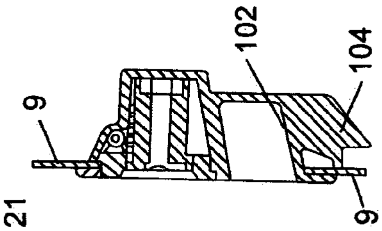
FIG. 29 is a sectional view taken along line H—H of the latch of FIG. 28 in a closed and locked position installed in a panel.
Figure 30:
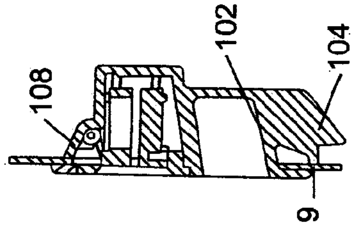
FIG. 30 is a sectional view taken along line G—G of the latch of FIG. 27 in a closed and unlocked position installed in a panel.
Figure 31:
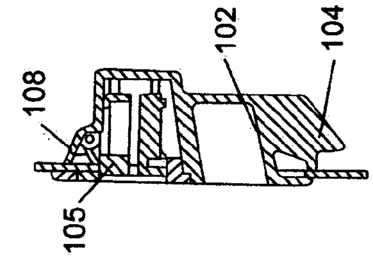
FIG. 31 is a sectional view taken along line G—G of the latch of FIG. 27 in an open and unlocked position installed in a panel.

As seen in FIG. 29 when a user has rotated the lock plug 105 such that blocking portion 121 prevents sliding of panel 9 toward the lock plug the latch is in the locked and closed position. When the latch is in the unlocked position as seen in FIG. 30, the latch can be slid such that panel 9 can slide toward the lock plug 105 such that the pawl 104 clears a keeper which permits unfastening of panel 9 in a manner similar to that shown in FIG. 14.

Figure 39:
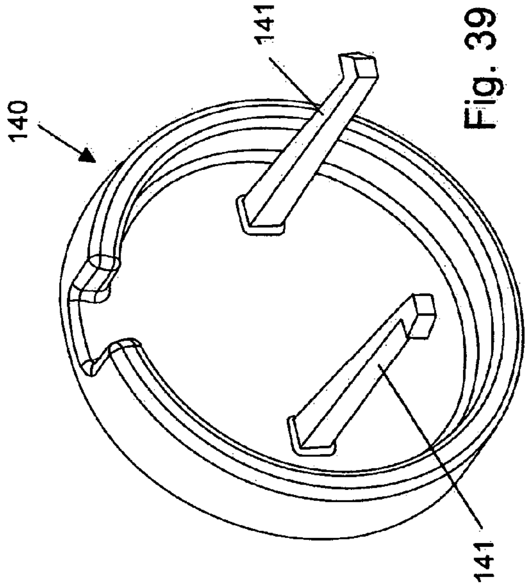
FIG. 39 is a perspective view of the cap shown in the latch of FIG. 38.
Figure 42:
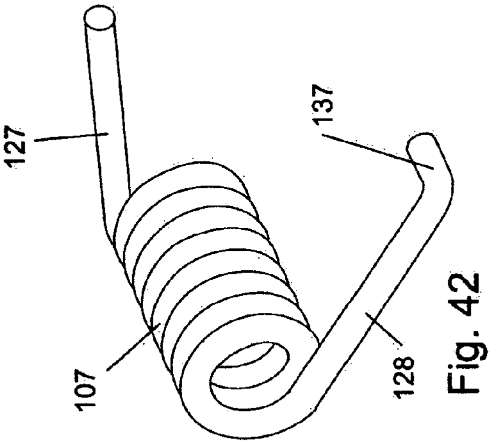
FIG. 42 is a perspective view of the torsion spring of the latch of FIG. 18.
Figure 38:
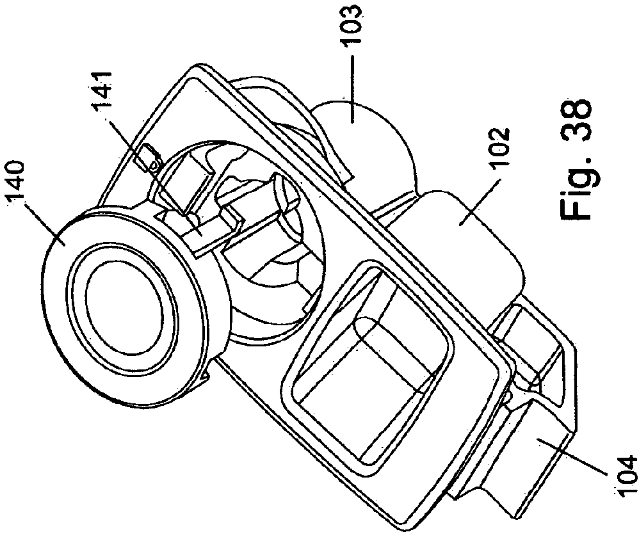
FIG. 38 is an exploded view of the latch of FIG. 18 shown having a cap being installed in the housing.
Figure 41:
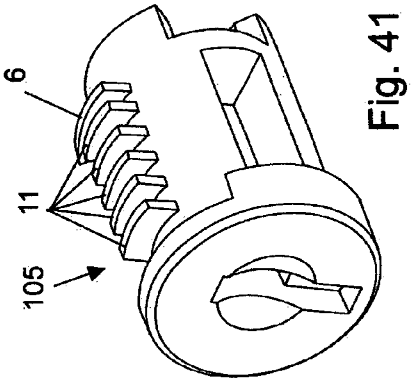
FIG. 41 is a perspective view of the lock plug of the latch of FIG. 18 showing the top of the lock plug.
Figure 40:
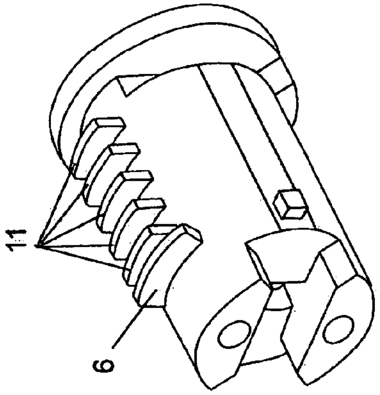
FIG. 40 is a perspective view of the lock plug of the latch of FIG. 18 showing the bottom of the lock plug.

As seen in FIG. 37, the second embodiment of the latch of the present invention can be fitted with a cap 140 seen in FIG. 39 which has cap legs 141 which extend into housing 103 and by spring action maintain the cap 141 in position in latch body 142.

The first and second embodiments of the latch are capable of being closed by slam action as seen in FIG. 17 with respect to the first embodiment whereby pawl protuberance 10 is dimensioned and configured to engage with a portion of second panel 20. Alternatively, the pawl 4 can engage with a keeper on second panel 20 such that the first panel in which the latch has been inserted is prevented from moving. In order to facilitate slam closing action of the latch, the pawl protuberance 10 can be of a shape which permits easy passage of the pawl protuberance 10 past the second panel 20. For example, rather than being substantially parallel to the first panel 9 as when the latch 1 is in a secured position as seen in FIG. 10, the pawl protuberance 10 can be angled upward to permit easy passage of the pawl 4 past the edge of the second panel 20 or a keeper on the second panel.

In the alternative, the slam close action of the pawl can be achieved due to the structure of the pawl itself which acts as a living spring. The pawl itself can be dimensioned and configured to undergo elastic deformation when the pawl on the slide latch of the present invention engages the second panel or a keeper connected thereto. For example, the gusset 14 can be dimensioned and configured to provide sufficient movement of the pawl such that the pawl clears the edge of the second panel or a keeper connected thereto.

The latch housing 3 can be manufactured from any suitable material such as plastic or metal. ABS plastic is a particularly preferred material for the base member due to its durability, ease of fabrication, low cost and resistance to corrosion. Although the housing 3 is shown as a solid piece of material in the section view of FIG. 17, it is preferred to provide hollow portions in the housing in order to save weight and material costs.

Figure 8:
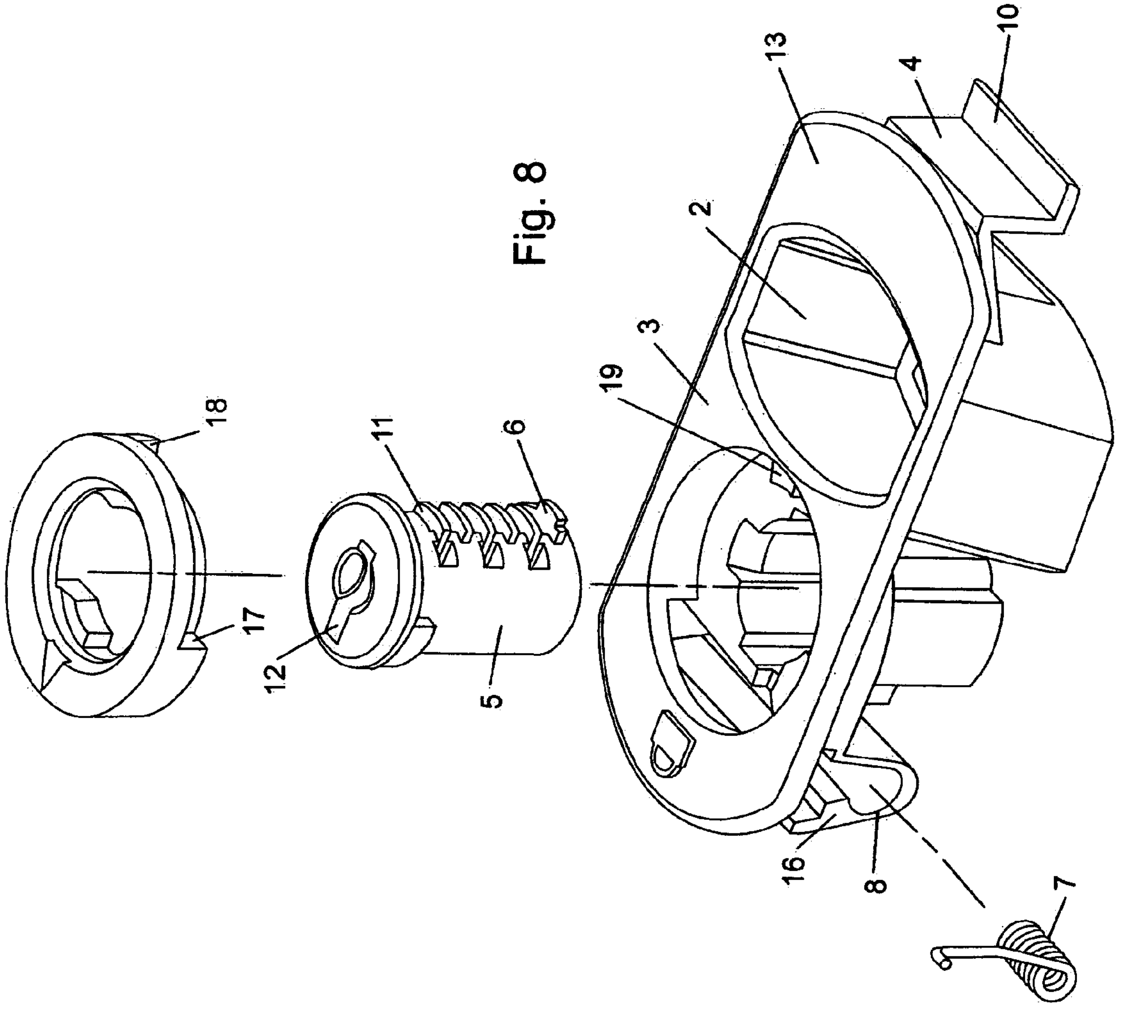
FIG. 8 is an exploded view of the latch of FIG. 1.

The biasing device or spring 7 can be manufactured from any suitable material such as plastic or metal. It is preferred to use corrosion resistant materials in the manufacture of the spring member. Acetals are preferred plastic for the spring member, with delrin being particularly preferred due to their excellent elasticity and resistance to corrosion, fracture and fatigue. It is also preferred to use a plastic that exhibits only minor changes in mechanical properties over varying temperature ranges. For example, if a latch of the present invention is to be subjected to a range of temperatures, it is desirable to use a plastic for the spring member that possesses relatively constant elasticity over the temperature range. As shown in FIG. 8, the spring 7 is preferably made from a single piece of material. However, various modifications can be made to the spring, including the use of separate springs that are inserted into spring support 8. Such separate springs may be made of any suitable material such as plastic or stainless steel.

Once assembled in the manner shown in FIG. 8, the locking slide latch of the present invention may be installed in a cut-out portion of a panel in a manner similar to conventional, non-locking slide latches. The installation of such conventional latches is described in U.S. Pat. Nos. 3,841,674 and 3,850,464, cited previously. A fully assembled and installed slide latch is shown in FIG. 10. The housing 3 is located in a cut-out portion of first panel 9. In the latched position shown in FIG. 10, the pawl protuberance 10 engages second panel 20 to thereby releasably retain the first panel 9 relative to the second panel 20.

As can be seen from the exploded view of FIG. 8, the slide latch of the present invention can be assembled simply without the use of tools. In addition, fastening means such as screws, rivets and adhesives used in conventional slide latches are not required during the assembly process. The use of the separate components for the housing 3, spring 7, locking collar 15 and lock plug 5 allows for many variations in the final latch, depending on the components selected. For example, the housing 3 can be provided in various dimensions to accommodate varying panel thicknesses. In this manner, the present latch may be altered to fit panels with thicknesses of less than 1 to greater than 10 mm. It is particularly preferred to provide the present slide latches in sizes that fit panels with thickness of from about 1.6 to about 6.5 mm. In addition, the end portion 16 of the member 10 may be altered to accommodate varying frame member sizes. Furthermore, the components of the present slide latches may be adjusted to provide variable grip ranges. Therefore, the slide latches of the present invention are adaptable to many varying applications and can be assembled to meet varying design criteria. Another advantage of the present slide latches is that they can be assembled without separate fasteners or adhesives and can easily be installed in a panel.

An arrow can be located on top of the locking collar such that when the locking collar is rotated to a locked position the arrow points to a lock symbol on the housing as shown in FIG. 7.

As an alternative, the lockable version of the slide latch can be made into a nonlockable version by removing the locking plug and adding a blanking cover in place of the lock plug.

A major advantage of the preferred slide latches of the present invention is their resistance to corrosion. The latches are preferably manufactured from corrosion resistant materials such as plastics, thereby allowing for use in automotive, recreational vehicle and marine applications, where exposure to moisture and other corrosive elements is frequently encountered.

Accordingly, it is understood that the above description of the present invention is susceptible to considerable modifications, changes and adaptations by those skilled in the art, and that such modifications, changes and adaptations are intended to be considered within the scope of the present invention, which is set forth by the appended claims.

We claim:

1. A slide latch for mounting on a first member for releasably latching of the first member to a second member, said slide latch comprising:

- a housing adapted for mounting on the first member, wherein said housing includes a means for mounting said housing slidably within an aperture in the first member such that said slide latch is mounted within the first member, said housing being positioned within the aperture in the first member, said housing having a flange for engaging an outer surface of the first member;
- a housing projection on said housing;
- a pawl on said housing for engaging the second member or a keeper on the second member;
- a grip recess on said housing for displacing said slide latch from an extended position in which said pawl is capable of engaging the second member or the keeper in a retracted position in which said pawl is prevented from engaging the second member or the keeper;
- a biasing device on said housing for biasing the movement of said slide latch toward the extended position;
- a lock plug recess on said housing;
- a lock plug rotatably mounted in said lock plug recess on said housing rotatable between a locked position in which said lock plug is prevented from rotating in said lock plug recess and an unlocked position in which said lock plug is rotatable in said lock plug recess; and
- a locking collar engaged with said lock plug, said locking collar having a first protrusion at a first location on said locking collar for preventing rotation of said locking collar past a first position when said locking collar is rotated and a second protrusion at a second location on said locking collar for preventing rotation of said locking collar past a second position when said locking collar is rotated and a blocking portion for engaging the first member and preventing sliding of said slide latch relative to the first member when the locking collar is rotated to the first position and for permitting sliding of said slide latch relative to the first member when the locking collar is rotated to the second position.

2. The slide latch according to claim 1 wherein said pawl engages the second member or the keeper by slam action.

3. The slide latch according to claim 2 wherein said pawl is a living spring.

4. The slide latch according to claim 2 wherein said pawl includes a protuberance configured and dimensioned for slam action.

5. The slide latch according to claim 1 wherein said housing covers said lock plug except for a top portion of said lock plug and said housing is made of an electrically insulating material.

6. The slide latch according to claim 1 wherein said biasing device is located on an end of said housing opposite said pawl.

7. The slide latch according to claim 6 wherein said biasing device is a spiral spring.

8. The slide latch according to claim 1 wherein said lock plug rotates through about 90 degrees between the locked position and the unlocked position.

9. The slide latch according to claim 1 wherein said lock plug snap fits into said lock plug recess in said housing.

10. The slide latch according to claim 1 wherein a gusset extends from said housing to said pawl said gusset supporting said pawl.

11. A slide latch for mounting on a first member for releasably latching of the first member to a second member, said slide latch comprising:

a housing adapted for mounting on the first member, wherein said housing includes a means for mounting said housing slidably within an aperture in the first member such that said slide latch is mounted within the first member, said housing being positioned within the aperture in the first member, said housing having a flange for engaging an outer surface of the first member;

a housing projection on said housing;

a pawl on said housing for engaging the second member or a keeper on the second member;

a grip recess on said housing for displacing said slide latch from an extended position in which said pawl is capable of engaging the second member or the keeper in a retracted position in which said pawl is prevented from engaging the second member or the keeper;

a biasing device on said housing for biasing the movement of said slide latch toward the extended position;

a lock plug recess on said housing;

a lock plug rotatably mounted in said lock plug recess on said housing rotatable between a locked position in which said lock plug is prevented from rotating in said lock plug recess and an unlocked position in which said lock plug is rotatable in said lock plug recess; and a locking collar engaged with said lock plug, said locking collar having:

a first protrusion at a first location on said locking collar, a second protrusion at a second location on said locking collar, a blocking portion for engaging the first member, a first detent adjacent to said blocking portion and a second detent adjacent to said blocking portion such that said biasing device acts against said locking collar at said first detent when said lock plug is in the locked position and also against said blocking portion as said lock plug is rotated and said biasing device also acts against said second detent when said lock plug in the unlocked position, whereby rotation of said lock plug and said locking collar from a first position in which said first protrusion engages said housing projection on said housing such that movement of said slide latch to the retracted position is permitted to a second position in which said second protrusion engages said housing projection such that said blocking portion of said locking collar engages the first member and prevents sliding movement of said slide latch to the retracted position and said lock plug and said locking collar are substantially prevented from movement from the second position when said lock plug is in locked position.

12. The slide latch according to claim 11 wherein said pawl engages the second member or the keeper thereon by slam action.

13. The slide latch according to claim 11 wherein said biasing device is a spiral spring and a spring leg of the spiral spring acts against said locking collar.

14. The slide latch according to claim 11 wherein said housing covers said lock plug except for a top portion of said lock plug and said housing is made of an electrically insulating material.

15. The slide latch according to claim 11 wherein said biasing device is located on an end of said housing opposite said pawl.

16. The slide latch according to claim 11 wherein said lock plug rotates through about 90 degrees between the locked position and the unlocked position.

17. The slide latch according to claim 11 wherein said lock plug snap fits into said lock plug recess in said housing.

18. The slide latch according to claim 11 wherein said pawl includes a protuberance configured and dimensioned for slam action.

19. The slide latch according to claim 11 wherein said pawl is a living spring.

* * * * *